United States Patent
Seto et al.

(10) Patent No.: US 6,784,129 B2
(45) Date of Patent: Aug. 31, 2004

(54) ULTRAVIOLET/INFRARED ABSORBENT LOW TRANSMITTANCE GLASS

(75) Inventors: Hiromitsu Seto, Osaka (JP); Yukihito Nagashima, Osaka (JP); Shigekazu Yoshii, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/262,891

(22) Filed: Oct. 3, 2002

(65) Prior Publication Data

US 2003/0050175 A1 Mar. 13, 2003

Related U.S. Application Data

(63) Continuation-in-part of application No. 09/817,119, filed on Mar. 27, 2001, now abandoned, which is a continuation-in-part of application No. 09/266,628, filed on Mar. 11, 1999, now abandoned.

(30) Foreign Application Priority Data

Apr. 13, 1998 (JP) ............................................ 10-101233

(51) Int. Cl.⁷ .......................... C03C 3/087; C03C 3/095
(52) U.S. Cl. .......................................... 501/71; 501/64
(58) Field of Search ............................. 501/64, 71, 70

(56) References Cited

U.S. PATENT DOCUMENTS

| | | | |
|---|---|---|---|
| 5,393,593 A | * | 2/1995 | Gulotta et al. .............. 428/220 |
| 5,582,455 A | * | 12/1996 | Casariego et al. ....... 296/146.2 |
| 5,688,727 A | * | 11/1997 | Shelestak et al. ............. 501/71 |
| 5,726,109 A | * | 3/1998 | Ito et al. ........................ 501/71 |
| 5,877,103 A | * | 3/1999 | Dupont et al. ................. 501/71 |
| 5,905,047 A | * | 5/1999 | Sasage et al. ................. 501/71 |
| 5,985,780 A | * | 11/1999 | Alvarez Casariego et al. ... 501/71 |
| 6,274,523 B1 | * | 8/2001 | Krumwiede et al. .......... 501/71 |
| 6,624,102 B2 | * | 9/2003 | Seto et al. ..................... 501/71 |

FOREIGN PATENT DOCUMENTS

EP  000653388  *  5/1995

* cited by examiner

Primary Examiner—Karl Group
(74) Attorney, Agent, or Firm—Manabu Kanesaka

(57) ABSTRACT

The ultraviolet/infrared absorbent low transmittance glass has a grayish green color shade, low visible light transmittance, low total solar energy transmittance, and low ultraviolet transmittance, and is suitable for a rear window of a vehicle and capable of protecting privacy. The glass is formed of a base glass including: 65 to 80 wt. % $SiO_2$; 0 to 5 wt. % $Al_2O_3$; 0 to 10 wt. % MgO; 5 to 15 wt. % CaO, wherein a total amount of MgO and CaO is between 5 and 15 wt. %; 10 to 18 wt. % $Na_2O$; 0 to 5 wt. % $K_2O$, wherein a total amount of $Na_2O$ and $K_2O$ is between 10 and 20 wt. %; and 0 to 5 wt. % $B_2O_3$, and colorants including: more than 0.95 wt. % and less than 1.2 wt. % total iron oxide (T-$Fe_2O_3$) expressed as $Fe_2O_3$; 0.001 to 0.0180 wt. % CoO; and 0.003 to 0.2 wt. % NiO.

14 Claims, No Drawings

US 6,784,129 B2

ULTRAVIOLET/INFRARED ABSORBENT LOW TRANSMITTANCE GLASS

CROSS REFERENCE TO RELATED APPLICATION

This is a continuation-in-part application of patent application Ser. No. 09/817,119 filed on March 27, 2001, abandoned, which is a continuation-in-part application of patent application Ser. No. 09/266,628 filed on Mar. 11, 1999, abandoned.

BACKGROUND OF THE INVENTION AND RELATED ART STATEMENT

The present invention relates to an ultraviolet/infrared absorbent low transmittance glass. More particularly, it relates to an ultraviolet/infrared absorbent low transmittance glass having a grayish green shade, a low visible light transmittance, a low solar energy transmittance, and a low ultraviolet transmittance, so that it is useful for windows of vehicles or buildings particularly for a privacy protecting glass in a rear window of a vehicle.

Recently, a variety of glasses with capable of absorbing ultraviolet/infrared light to be used as a vehicle windshield has been proposed for preventing degradation of luxurious interior materials and reducing cooling load of the vehicle. In view of privacy protection, a glass with relatively low visible light transmittance is preferably used for a rear window glass of a vehicle. Such kinds of glass include the followings.

For example, a dark gray colored infrared absorbent glass disclosed in Japanese Patent Publication No. 07-29813B consists of the soda-lime-silica glass including colorants consisting of 1.00 to 1.7 weight percent of $Fe_2O_3$ (total iron), at least 0.27 weight percent of FeO, 0.002 to 0.005 weight percent of Se, and 0.01 to 0.02 weight percent of CoO. The glass exhibits less than 32 percent of the luminous transmittance and less than 15 percent of the total solar infrared transmittance at 3.9 mm thickness.

A dark gray colored glass disclosed in Japanese Patent Publication No. 08-157232A consists of a soda-lime-silica glass including colorants consisting of 0.8 to 1.4 weight percent of $Fe_2O_3$ (total iron), less than 0.21 weight percent of FeO, 0.05 to 1.0 weight percent of $TiO_2$, 0.02 to 0.05 weight percent of CoO, and 0.0005 to 0.015 weight percent of Se.

A neutral gray colored glass disclosed in claim 25 of U.S. Pat. No. 5,393,593 consists of a soda-lime-silica glass including colorants consisting of 1.00 to 2.2 weight percent of $Fe_2O_3$ (total iron), at least 0.20 weight percent of FeO, 0.0005 to 0.005 weight percent of Se, and 0.010 to 0.030 weight percent of CoO. The glass exhibits less than 35 percent of the luminous transmittance and less than 20 percent of the total solar infrared transmittance at 3.9 mm thickness.

A glass disclosed in PCT (Japanese phase) No. 07-508971 consists of a soda-lime-silica glass including colorants consisting of 1.3 to 2.0 weight percent of $Fe_2O_3$ (total iron), about 0.01 to 0.05 weight percent of NiO, about 0.02 to 0.04 weight percent of $Co_3O_4$, about 0.0002 to 0.003 weight percent of Se and 18 to 30 weight percent of a ferrous iron value, resulting in less than 0.53 of a light and shade coefficient.

In both the dark gray colored infrared absorbent glass disclosed in Japanese Patent Publication No. 07-29813B and the neutral gray colored glass disclosed in U.S. Pat. No. 5,393,593, a great quantity of Se is used for providing a desirable color. However, such a great quantity of Se is not favorable for the environment because Se is toxic and easy to vaporize. The above dark gray glass disclosed in Japanese Patent Publication No. 08-157232A including 0.05 to 1.0 weight percent of $TiO_2$ as an essential component is not preferable because $TiO_2$ is expensive to thereby increase a cost.

The aforementioned glass includes the high concentration of selenium to provide optical properties, essentially without including nickel.

The glass disclosed in PCT (Japanese phase) No. 07-508971 is prepared from a standard soda-lime-silica glass, to which iron oxide, cobalt oxide, nickel oxide and selenium are added in a specific ratio. However, the glass composition disclosed therein has the great concentration of selenium and a small amount of nickel oxide.

It is an object of the present invention to provide an ultraviolet/infrared absorbent low transmittance glass having a grayish green shade, a low visible light transmittance, a low solar energy transmittance and a low ultraviolet transmittance, thus it is useful for a window of a vehicle or a building, particularly for a privacy protecting glass of a rear window of a vehicle.

SUMMARY OF THE INVENTION

An ultraviolet/infrared absorbent low transmittance glass of the present invention is formed of a base glass and a colorant, wherein major constituents of the base glass are 65 to 80 wt. % of $SiO_2$; 0 to 5 wt. % of $Al_2O_3$; 0 to 10 wt. % of MgO and 5 to 15 wt. % of CaO wherein a total amount of MgO and CaO is between 5 and 15 wt. %; 10 to 18 wt. % of $Na_2O$ and 0 to 5 wt. % $K_2O$ wherein a total amount of $Na_2O$ and $K_2O$ is between 10 and 20 wt. %; and 0 to 5 wt. % of $B_2O$ Also, the colorant includes more than 0.95 and less than 1.2 wt. % of total iron oxide (T-$Fe_2O_3$) expressed as $Fe_2O3$, i.e. 0.95<T-$Fe_2O_3$<1.2; 0.001 to 0.03 wt. % of CoO; and 0.003 to 0.2% of NiO.

The glass of the present invention does not substantially contain Se. The glass of the present invention is preferable to be reinforced by blasting air cooling for a desired color shade.

DETAILED DESCRIPTION OF THE PREFERRED EMBODIMENT

Hereunder, embodiments of an ultraviolet/infrared absorbent low transmittance glass composition will be explained. It should be noted that components are represented in weight percentage.

$SiO_2$ (silica) is a principal component of the ultraviolet/infrared absorbent low transmittance glass. Less than 65% of $SiO_2$ lowers durability of a glass and more than 80% of $SiO_2$ raises a melting temperature of a glass too high.

$Al_2O_3$ is a component for improving the durability of the glass. More than 5% $Al_2O_3$ raises a melting temperature of a glass too high. A preferable range of $Al_2O_3$ is between 0.1% and 2%.

MgO and CaO are used to improve the durability of a glass and adjust a devitrification temperature and a viscosity of a glass during molding. More than 10% of MgO raises the devitrification temperature. Less than 5% or more than 15% CaO raises the devitrification temperature of a glass. The durability of a glass is lowered when the total amount of MgO and CaO is less than 5%, while the devitrification temperature is increased when the total amount of MgO and CaO exceeds 15%.

$Na_2O$ and $K_2O$ prompt a glass to melt. An efficiency of promoting the melting becomes poor when $Na_2O$ is less than 10% or the total of $Na_2O$ and $K_2O$ is less than 10%, while the durability of a glass is lowered when $Na_2O$ exceeds 18% or the total of $Na_2O$ and $K_2O$ exceeds 20%. It is preferable for $K_2O$ not to exceed 5% because of a cost.

$B_2O_3$ is a component for improving the durability of a glass, prompting to melt, and yet enhancing the ultraviolet absorption. $B_2O_3$ should be less than 5%, since it becomes difficult to mold due to vaporization of $B_2O_3$.

Iron oxide is present in the form of $Fe_2O_3$ and FeO in the glass. $Fe_2O_3$ is a component for improving the ultraviolet absorption and FeO is a component for improving the heat rays absorption. The iron in the composition of the glass makes the glass green tint.

When a total amount of iron oxide (T-$Fe_2O_3$) expressed as $Fe_2O_3$ is less than 0.95%, the efficiency of ultraviolet and infrared absorption becomes too small to provide desired optical properties. On the other hand, when T-$Fe_2O_3$ exceeds 1.2%, it is difficult to obtain a desired grayish color shade because a large amount of iron makes the color green tint too much.

When T-$Fe_2O_3$ is not greater than 1.1%, iron in the composition is effective in coloring the glass green tint and improves the visible light transmittance, thus other colorants can be added to adjust the shade. T-$Fe_2O_3$ is therefore contained in an amount between 0.95% and 1.2%, preferably not more than 1.1%.

$Fe_2O_3$ particularly has a function of increasing the light absorption in the ultraviolet range when the glass is reinforced by air blast cooling. This means that the glass of this invention can obtain enough efficiency of the ultraviolet absorption without using expensive ultraviolet absorbent such as $CeO_2$ and $TiO_2$. When T-$Fe_2O_3$ is in the range mentioned above, the desired color shade of the glass can be obtained after discoloration due to the reinforcement process by the air blast cooling.

When the FeO/T-$Fe_2O_3$ ratio (a weight of FeO expressed as $Fe_2O_3$ against T-$Fe_2O_3$) is too low, sufficient heat ray absorption can not be achieved because the amount of FeO is too small. Also, many bubbles can be formed in a molten glass because the molten glass is relatively reactive with oxygen, so that a product yield is lowered. When the FeO/T-$Fe_2O_3$ ratio is too high, the visible light transmittance is reduced and the color becomes blue tint. In addition, nickel sulfide stones are sometimes present in the molten glass because the molten glass is relatively reductive. Too high ratio of FeO/T-$Fe_2O_3$ is also not preferable since it causes streaks with enough silica and silica scum.

In the present invention, the FeO/T-$Fe_2O_3$ ratio in a range between 0.15 and 0.4 brings a green shade, which is an almost neutral color having high ultraviolet absorption and high heat ray absorption. In this case, values expressed as $Fe_2O_3$ are used for the content of FeO.

CoO is a component for obtaining an almost neutral color such as greenish gray shade in cooperating with Se and/or NiO, and $Fe_2O_3$ for controlling the visible light transmittance. Less than 0.001% CoO can not form a desired color shade and makes the visible light transmittance too high. More than 0.03% CoO makes the color too blue tint and reduces the visible light transmittance. A content of CoO is preferable to be in a range of 0.001% to 0.018%.

NiO is a component for controlling the visible light transmittance and for reducing the excitation purity as like as CoO. It should be understood that NiO may not be always included when Se is included. When NiO is included more than 0.2%, nickel sulfide stones are sometimes present in a product and the visible light transmittance is reduced. In addition, the obtained shade becomes too greenish. When using NiO, the content thereof is preferably in a range between equal to or more than 0.003% and less than 0.05% for middle visible light transmittance, or in a range between 0.05% and 0.2% for low visible light transmittance.

When a concentration of NiO in the glass is too high, there is a possibility that NiO coagulates to form a nickel sulfide stone. However, when NiO is in the range defined by this invention, the desired color shade can be obtained without producing the nickel sulfide stone.

It is known that the coordination number of NiO varies according to a rate of cooling a glass so that the color of the glass varies. This is because the cooling rate changes the coordination number of oxide around $Ni^{2+}$ from 6 to 4 and thus changes the optical absorption. The absorption of $Ni^{2+}$ with octahedral coordination exists around 430 nanometer to thereby impart yellow to the glass, while the absorption of $Ni^{2+}$ with tetrahedral coordination exists between 500 and 640 nanometers. Therefore, the excitation purity would be reduced to obtain the preferable shade when using $Ni^{2+}$ with tetrahedral coordination. A windshield of a passenger car is normally reinforced by air blast cooling for safety. The reinforcement process by air blast cooling also changes the coloring condition of NiO. In the present invention, the desired color shade can be obtained through the discoloration from the reinforcement process by the air blast cooling without adding Se.

$CeO_2$ is a component for improving the ultraviolet absorption and is present in the form of $Ce^{3+}$ or $Ce^{4+}$ in the glass. Particularly, $Ce^{3+}$ is effective in absorbing ultraviolet light with less absorption of the visible light. In the present invention, an oxide of $Ce^{3+}$ is also expressed in terms of $CeO_2$ and is included in the total amount of $CeO_2$.

$TiO_2$ is a component for improving the ultraviolet absorption particularly by interaction with FeO. $TiO_2$ can be added to improve the ultraviolet absorption within such a range as not to lose the grayish green color shade, or to add a yellow tint in order to obtain the desired color shade. The use of expensive $CeO_2$ and $TiO_2$ increases the cost so that it is not preferable to use more than 2% $CeO_2$ and $TiO_2$.

One or more than two ingredients among MnO, $V_2O_5$, $MoO_3$, CuO, and the like may be added as colorant, and $SnO_2$ within a rang from 0% to 1% in total amount may be added as a reducing agent in such a range as not to lose middle transmittance and the grayish green shade. There is substantially no $Cr_2O_3$ contained except a trace amount from raw materials as an impurity, which is very difficult to eliminate. To further securely prevent the formation of nickel sulfide stones, ZnO may be added in a range from 0% to 1%.

In the present invention, the glass is preferable to be reinforced by the air blasting. The desired color shade and optical properties are obtained in the reinforced process when the glass has a composition of the present invention comprising NiO and $Fe_2O_3$ in the specific amount.

In the reinforcement process, the glass plate produced from the molten glass is reheated at 600 to 750° C. for 2 to 5 minutes, and then, cooled by blasting air of 10 to 30° C. at a cooling rate of 100 to 300° C./sec.

The air blasting reinforcement process makes the glass plate comprising NiO and $Fe_2O_3$ have the greenish gray and almost neutral shade, and have the low visible light transmittance and the low ultraviolet transmittance while keeping an ability of absorbing the high heat rays.

In the present invention, when measured by using C.I.E standard illuminant "A", the glass with a thickness between 2 to 5 mm has a visible light transmittance (YA) in a range from 10% to 50%, a solar energy transmittance (TG) of not greater than 30% and an ultraviolet transmittance (Tuv) defined by ISO of not greater than 12%.

When using the color system of L*, a*, b*, the chromaticity, expressed as a* and b* of the glass color, is preferably in a range of $-8 \leq a^* \leq -2$ and $-2 \leq b^* \leq 4$, respectively.

When measured by using C.I.E. standard illuminant "C" over the wavelength range between 380 and 770 nanometers, the glass of the present invention preferably has optical properties with a dominant wavelength ($\lambda$d) in a range between 480 and 580 nanometers and an excitation purity (Pe) of less than 9% in a case the glass has a thickness of 4 mm.

Hereinafter, a mode of carrying out the present invention will be described with reference to examples.

EXAMPLES 1 THROUGH 9

A glass raw material is prepared by adding required ingredients consisting of ferric oxide, titanium oxide, cerium oxide, cobalt oxide, metallic selenium, and nickel oxide into a standard soda-lime-silica glass batch composition, also by adding carbonaceous reducing agent (concretely, coke powder etc.) at a ratio of about 0.01 parts by weight per 100 parts of the glass raw material therein, and mixing them. The glass raw material thus prepared is heated and melted in an electric furnace at 1500° C. for 4 hours. The molten glass is flowed onto a stainless plate and annealed to the room temperature to obtain a 6 mm thick glass plate. After polishing the glass plate so that the thickness reduces to 4 mm, the glass plate is reinforced with reheating it at 700° C. for 5 minutes and then cooling it with 20° C. air blast at 3.2 to 2.1 kgf/mm² wind flow to obtain a sample. Each sample is measured for the visible light transmittance by the C.I.E. illuminant A (YA), the solar energy transmittance (TG), the ultraviolet transmittance by ISO 9050(Tuv), the dominant wavelength by the illuminant C($\lambda$d), and the excitation purity (Pe). And, L*, a* and b* are measured in accordance with C.I.E.L.A.B.

Table 1 shows the base glass compositions of the obtained samples, T-$Fe_2O_3$ concentration, FeO (expressed as $Fe_2O_3$) concentration, FeO. (expressed as $Fe_2O_3$) /T-$Fe_2O_3$ ratio, CoO concentration, Se concentration, NiO concentration, $CeO_2$ concentration, and $TiO_2$ concentration. The numerals in Table are indicated as a weight percentage except that CoO concentration, Se concentration, and NiO concentration are expressed in ppm. Table 1 also shows the optical properties of the respective samples.

TABLE 1

|  | 1 | 2 | 3 | 4 | 5 | 6 | 7 | 8 |
|---|---|---|---|---|---|---|---|---|
| Composition |  |  |  |  |  |  |  |  |
| $SiO_2$ | 71.8 | 71.8 | 71.8 | 71.8 | 71.8 | 71.8 | 71.8 | 71.8 |
| $Al_2O_3$ | 1.7 | 1.7 | 1.7 | 1.7 | 1.7 | 1.7 | 1.7 | 1.7 |
| MgO | 3.8 | 3.8 | 3.8 | 3.8 | 3.8 | 3.8 | 3.8 | 3.8 |
| CaO | 7.8 | 7.8 | 7.8 | 7.8 | 7.8 | 7.8 | 7.8 | 7.8 |
| $Na_2O$ | 13.9 | 13.9 | 13.9 | 13.9 | 13.9 | 13.9 | 13.9 | 13.9 |
| $K_2O$ | 1.0 | 1.0 | 1.0 | 1.0 | 1.0 | 1.0 | 1.0 | 1.0 |
| $B_2O_3$ | 0.0 | 0.0 | 0.0 | 0.0 | 0.0 | 0.0 | 0.0 | 0.0 |
| T—$Fe_2O_3$ | 1.00 | 1.10 | 0.96 | 1.00 | 1.10 | 1.00 | 1.00 | 1.18 |
| FeO | 0.24 | 0.26 | 0.17 | 0.35 | 0.26 | 0.25 | 0.26 | 0.35 |
| FeO/T—$Fe_2O_3$ | 0.27 | 0.26 | 0.20 | 0.39 | 0.26 | 0.28 | 0.29 | 0.33 |
| $CeO_2$ |  |  |  |  |  |  | 0.30 |  |
| $TiO_2$ | 1.00 | 0.10 | 0.05 | 0.06 | 0.03 | 0.05 | 0.05 | 0.06 |
| Se(ppm) | 0.00 | 0.00 | 0.00 | 0.00 | 0.00 | 0.00 | 0.00 | 0.00 |
| CoO(ppm) | 150 | 150 | 170 | 230 | 120 | 180 | 180 | 110 |
| NiO(ppm) | 480 | 570 | 600 | 1000 | 330 | 900 | 1800 | 800 |
| Optical Property |  |  |  |  |  |  |  |  |
| YA(%) | 28.6 | 33.5 | 44.9 | 19.0 | 43.9 | 32.3 | 16.0 | 48.9 |
| TG(%) | 23.8 | 25.8 | 29.7 | 16.2 | 28.4 | 27.2 | 17.6 | 29.6 |
| Tuv(%) | 5.1 | 8.3 | 11.2 | 11.0 | 10.6 | 10.8 | 11.4 | 11.6 |
| L* | 61.35 | 53.90 | 61.37 | 61.37 | 61.17 | 52.17 | 47.14 | 73.22 |
| a* | −6.81 | −5.86 | −2.69 | −2.69 | −6.65 | −5.31 | −4.31 | −7.96 |
| b* | 0.02 | −1.90 | −0.47 | −0.47 | −1.87 | −1.94 | 3.98 | −2.00 |
| $\lambda$d(nm) | 491.7 | 485.8 | 481.9 | 481.9 | 477.8 | 477.0 | 567.9 | 459.6 |
| Pe(%) | 7.4 | 8.1 | 10.1 | 10.1 | 6.9 | 9.2 | 12.4 | 3.4 |
|  | 4 mm | 3.9 mm | 3.9 mm | 3.9 mm | 3.9 mm | 3.9 mm | 3.1 mm | 3.6 mm |

Table 1 shows that all glasses having thicknesses of about 3–4 mm of Examples 1 through 8 have the visible light transmittance (YA) between 10% and 50%, the solar energy transmittance (TG) of less than 30%, and the ultraviolet transmittance (Tuv) of less than 12%. Each of the glasses has the FeO/T-$Fe_2O_3$ ratio in a range from 0.15 to 0.4.

These samples show the chromaticity expressed by a* and b* in the ranges $-8 \leq a^* \leq -2$ and $-2 \leq b^* \leq 4$, the dominant wavelength ($\lambda$d) measured by using the illuminant "C" between 480 and 580 nanometers, and the excitation purity (Pe) of less than 9%.

The glasses having large values of a* have preferable grayish green shade. A relatively small amount of CoO does not reduce the visible light transmittance of these samples or does not make these glasses too blue tint.

These samples farther include $CeO_2$ and/or $TiO_2$ to improve the ultraviolet transmittance. Therefore, when the glass compositions of the examples mentioned above are used for windshields of vehicles and windows of buildings, good effects of preventing degradation of interior materials and of privacy protecting can be obtained.

COMPARATIVE EXAMPLES 1–5

Table 2 shows glass components and optical properties of comparative examples made in the same manner as in Examples 1–8 but the glass components are different.

TABLE 2

| Comparative Examples | 1 | 2 | 3 | 4 | 5 |
|---|---|---|---|---|---|
| Composition | | | | | |
| $SiO_2$ | 71.8 | 71.8 | 70.8 | 71.7(7) | 71.7(7) |
| $Al_2O_3$ | 1.7 | 1.7 | 1.7 | 1.7 | 1.7 |
| MgO | 3.8 | 3.8 | 3.8 | 3.8 | 3.8 |
| CaO | 7.8 | 7.8 | 7.8 | 7.8 | 7.8 |
| $Na_2O$ | 13.9 | 13.9 | 13.9 | 13.9 | 13.9 |
| $K_2O$ | 1.0 | 1.0 | 1.0 | 1.0 | 1.0 |
| $B_2O_3$ | 0.0 | 0.0 | 1.0 | 0.0 | 0.0 |
| $T-Fe_2O_3$ | 1.12 | 1.38 | 1.653 | 1.20 | 0.95 |
| FeO | 0.388 | 0.210 | — | 0.301 | 0.237 |
| $FeO/T-Fe_2O_3$(%) | 38.5 | 16.9 | 21.9 | 25.1 | 24.9 |
| $CeO_2$ | — | — | — | — | — |
| $TiO_2$ | — | 0.10 | — | 0.03 | 0.03 |
| Se(ppm) | 19 | 43 | 20 | 3 | 3 |
| CoO(ppm) | 114 | 235 | 236 | 180 | 120 |
| NiO(ppm) | — | — | 256 | 1000 | 350 |
| Optical Property | | | | | |
| YA(%) | 24.1 | 17.1 | 16.0 | 16.6 | 34.8 |
| TG(%) | 16.1 | 16.6 | 13.4 | 15.4 | 27.7 |
| Tuv(%) | 14.3 | 2.50 | 7.90 | 8.26 | 12.33 |
| L* | — | — | 47.10 | 47.79 | 66.38 |
| a* | — | — | −4.32 | −8.32 | −7.30 |
| b* | — | — | 4.55 | 2.12 | −1.80 |
| λd(nm) | 491.6 | 530 | 560.1 | 507.4 | 493.1 |
| Pe(%) | 3.88 | 3.90 | 6.50 | 4.05 | 5.63 |

All of Comparative Examples 1–5 have compositions out of the range of the present invention. The comparative example 1 has the same composition as the example in Japanese Patent Publication No. 07-29813B, which shows the glass produced by the vacuum refining process, as referred to in the prior art description. The comparative example 2 has the same composition as the example in Japanese Patent Publication No. 08-157232A as referred above. The comparative example 3 has the same composition as the example in PCT (Japanese phase) No. 07-508971 as referred to above.

It should be noted that the optical properties of the comparative example 1 are indicated in converted values based on a glass thickness of 3.9 mm and the optical properties of the comparative example 2 are indicated in converted values based on a glass thickness of 5 mm.

The comparative examples 4 and 5 contain $T-Fe_2O_3$ of an amount that is out of the claimed range.

As detailed above, according to the present invention, an ultraviolet/infrared absorbent low transmittance glass, which exhibits low visible light transmittance, low solar energy transmittance, and low ultraviolet transmittance and has grayish green shade can be provided.

The ultraviolet/infrared absorbent low transmittance glass having the greenish gray shade can exhibit the effect of preventing degradation and discoloration of interior materials and the privacy protecting effect when the glass is used for a rear window glass of a vehicle, a window of a building, or the like.

What is claimed is:

1. An ultraviolet/infrared absorbent low transmittance glass consisting of a base glass and colorants, said base glass consisting essentially of:

65 to 80 wt. % $SiO_2$;

0 to 5 wt. % $Al_2O_3$;

0 to 10 wt. % MgO;

5 to 15 wt. % CaO, wherein a total amount of MgO and CaO is between 5 and 15 wt. %;

10 to 18 wt. % $Na_2O$;

0 to 5 wt. % $K_2O$, wherein a total amount of $Na_2O$ and $K_2O$ is between 10 and 20 wt. %; and 0 to 5 wt. % $B_2O_3$, and said colorants consisting essentially of:

more than 0.95 wt. % and less than 1.2 wt. % total iron oxide ($T-Fe_2O_3$) expressed as $Fe_2O_3$;

0.001–0.030 wt. % CoO; and 0.003–0.2 wt. % NiO.

2. An ultraviolet/infrared absorbent low transmittance glass as claimed in claim 1, wherein $T-Fe_2O_3$ is greater than 0.95 wt. % and not greater than 1.1 wt. %.

3. An ultraviolet/infrared absorbent low transmittance glass as claimed in claim 1, wherein CoO is between 0.001 wt. % and 0.0175 wt. %.

4. An ultraviolet/infrared absorbent low transmittance glass as claimed in claim 1, wherein NiO is equal to or more than 0.003 wt. % and less than 0.055 wt. %.

5. An ultraviolet/infrared absorbent low transmittance glass as claimed in claim 1, wherein NiO is between 0.055 wt. % and 0.2 wt. %.

6. An ultraviolet/infrared absorbent low transmittance glass as claimed in claim 1, wherein FeO expressed as $Fe_2O_3$ is between 15 wt. % and 40 wt. % of $T-Fe_2O_3$.

7. An ultraviolet/infrared absorbent low transmittance glass as claimed in claim 1, wherein the glass with a thickness between 2 mm and 5 mm has a visible light transmittance (YA) by C.I.E. illuminant "A" in a range from 10% to 50%, a solar energy transmittance of not greater than 30%, and an ultraviolet transmittance of not greater than 12% specified by ISO.

8. An ultraviolet/infrared absorbent low transmittance glass as claimed in claim 1, wherein the glass has a color of $-8 \leq a^* \leq -2$ and $-2 \leq b^* \leq 4$ defined by C.I.E.L.A.B. coordinates, and a grayish green shade.

9. An ultraviolet/infrared absorbent low transmittance glass as claimed in claim 1, wherein the glass is reinforced by air blast cooling.

10. An ultraviolet/infrared absorbent low transmittance glass as claimed in claim 1, wherein said colorants consists of more than 0.95 wt. % and less than 1.2 wt. % total iron oxide ($T-Fe_2O_3$) expressed as $Fe_2O_3$, 0.001–0.030 wt. % CoO, and 0.003–0.2 wt. % NiO without containing Se.

11. An ultraviolet/infrared absorbent low transmittance glass as claimed in claim 1, wherein a ratio of NiO/CoO is equal to or greater than 2.75 and equal to or less than 10.0.

12. An ultraviolet/infrared absorbent low transmittance glass as claimed in claim 1, wherein a dominant wavelength by illuminant C is between 459.6 and 567.9 nm.

13. An ultraviolet/infrared absorbent low transmittance glass as claimed in claim 1, wherein said glass has a grayish green shade.

14. An ultraviolet/infrared absorbent low transmittance glass consisting of a base glass and colorants, said base glass consisting essentially of:

65 to 80 wt. % $SiO_2$;

0 to 5 wt. % $Al_2O_3$;

0 to 10 wt. % MgO;

5 to 15 wt. % CaO, wherein a total amount of MgO and CaO is between 5 and 15 wt. %;

10 to 18 wt. % $Na_2O$;

0 to 5 wt. % $K_2O$, wherein a total amount of $Na_2O$ and $K_2O$ is between 10 and 20 wt. %; and 0 to 5 wt. % $B2O_3$, and said colorants consisting essentially of:

more than 0.95 wt. % and less than 1.2 wt. % total iron oxide (T-Fe$_2$O$_3$) expressed as Fe$_2$O$_3$;
0.001–0.030 wt. % CoO;
0.003–0.2 wt. % NiO;
less than 2 wt. % CeO$_2$; and
less than 2 wt. % TiO$_2$.

* * * * *